United States Patent
Gil-Cacho et al.

(10) Patent No.: US 12,436,283 B2
(45) Date of Patent: Oct. 7, 2025

(54) THREE-DIMENSIONAL IMAGE CAPTURING ACCORDING TO TIME-OF-FLIGHT MEASUREMENT AND LIGHT SPOT PATTERN MEASUREMENT

(71) Applicant: Sony Semiconductor Solutions Corporation, Kanagawa (JP)

(72) Inventors: Jose Manuel Gil-Cacho, Stuttgart (DE); Sebastien Louveaux, Stuttgart (DE)

(73) Assignee: Sony Semiconductor Solutions Corporation, Kanagawa (JP)

( * ) Notice: Subject to any disclaimer, the term of this patent is extended or adjusted under 35 U.S.C. 154(b) by 270 days.

(21) Appl. No.: 18/273,546

(22) PCT Filed: Jan. 26, 2022

(86) PCT No.: PCT/EP2022/051662
§ 371 (c)(1),
(2) Date: Jul. 21, 2023

(87) PCT Pub. No.: WO2022/161964
PCT Pub. Date: Aug. 4, 2022

(65) Prior Publication Data
US 2024/0103168 A1    Mar. 28, 2024

(30) Foreign Application Priority Data
Jan. 27, 2021  (EP) .................................... 21153725

(51) Int. Cl.
*G01S 17/36* (2006.01)
*G01S 17/46* (2006.01)
*G01S 17/894* (2020.01)

(52) U.S. Cl.
CPC .............. *G01S 17/36* (2013.01); *G01S 17/46* (2013.01); *G01S 17/894* (2020.01)

(58) Field of Classification Search
CPC ......... G01S 17/36; G01S 17/46; G01S 17/894
See application file for complete search history.

(56) References Cited

U.S. PATENT DOCUMENTS

| 10,916,023 | B2* | 2/2021 | Hall .................... G01S 17/32 |
| 11,770,633 | B2* | 9/2023 | Suess ................... H10F 39/153 |
| | | | 348/308 |
| 2016/0200161 | A1 | 7/2016 | Van Den Bossche |
| 2018/0247424 | A1 | 8/2018 | Bleyer et al. |
| 2019/0004156 | A1 | 1/2019 | Niclass |
| 2020/0033478 | A1 | 1/2020 | Van Dyck |
| 2020/0090355 | A1 | 3/2020 | Hall |

OTHER PUBLICATIONS

International Search Report and Written Opinion mailed on May 11, 2022, received for PCT Application PCT/EP2022/051662, filed on Jan. 26, 2022, 10 pages including English Translation.
Kushida et al., "Spatio-temporal Phase Disambiguation in Depth Sensing", 2019 IEEE International Conference on Computational Photography (ICCP), IEEE, May 15, 2019, 7 pages.

* cited by examiner

*Primary Examiner* — Seung C Sohn
(74) *Attorney, Agent, or Firm* — XSENSUS LLP

(57) ABSTRACT

An electronic device comprising circuitry configured to disambiguate a first phase delay obtained according to an indirect Time-of-Flight principle to obtain a second phase delay, wherein the circuitry is configured to disambiguate the first phase delay based on a captured spot position.

20 Claims, 15 Drawing Sheets

THREE-DIMENSIONAL IMAGE CAPTURING ACCORDING TO TIME-OF-FLIGHT MEASUREMENT AND LIGHT SPOT PATTERN MEASUREMENT

CROSS-REFERENCE TO RELATED APPLICATIONS

The present application is based on PCT filing PCT/EP2022/051662, filed Jan. 26, 2022, and claims priority to European Application No. 21153725.3, filed Jan. 27, 2021, the entire contents of each are incorporated herein by reference.

TECHNICAL FIELD

The present disclosure generally pertains to the field of Time-of-Flight imaging, and in particular to devices and methods for Time-of-Flight image processing.

TECHNICAL BACKGROUND

A Time-of-Flight (ToF) camera is a range imaging camera system that determines the distance of objects by measuring the time of flight of a light signal between the camera and the object for each point of the image. Generally, a Time-of-Flight camera has an illumination unit that illuminates a region of interest with modulated light, and a pixel array that collects light reflected from the same region of interest.

In indirect Time-of-Flight (iToF), three-dimensional (3D) images of a scene are captured by an iToF camera, which is also commonly referred to as "depth map", or "depth image" wherein each pixel of the iToF image is attributed with a respective depth measurement. The depth image can be determined directly from a phase image, which is the collection of all phase delays determined in the pixels of the iToF camera.

It is known that the operational principle of iToF measurements which is based on determining phase delays may result in a phase ambiguity which translates to a distance ambiguity of iToF measurements. Approaches which try to resolve the phase/distance ambiguity are referred to as "phase unwrapping" techniques.

Although there exist techniques for preventing distance ambiguity of Time-of-Flight cameras, it is generally desirable to provide better techniques for preventing distance ambiguity of a Time-of-Flight camera.

SUMMARY

According to a first aspect the disclosure provides an electronic device comprising circuitry configured to disambiguate a first phase delay obtained according to an indirect Time-of-Flight principle to obtain a second phase delay, wherein the circuitry is configured to disambiguate the first phase delay based on a captured spot position.

According to a further aspect the disclosure provides a method comprising disambiguating a first phase delay obtained according to an indirect Time-of-Flight principle to obtain a second phase delay, wherein the disambiguating of the first phase delay is based on a captured spot position.

Further aspects are set forth in the dependent claims, the following description, and the drawings.

BRIEF DESCRIPTION OF THE DRAWINGS

Embodiments are explained byway of example with respect to the accompanying drawings, in which.

DETAILED DESCRIPTION OF EMBODIMENTS

Figure 1:
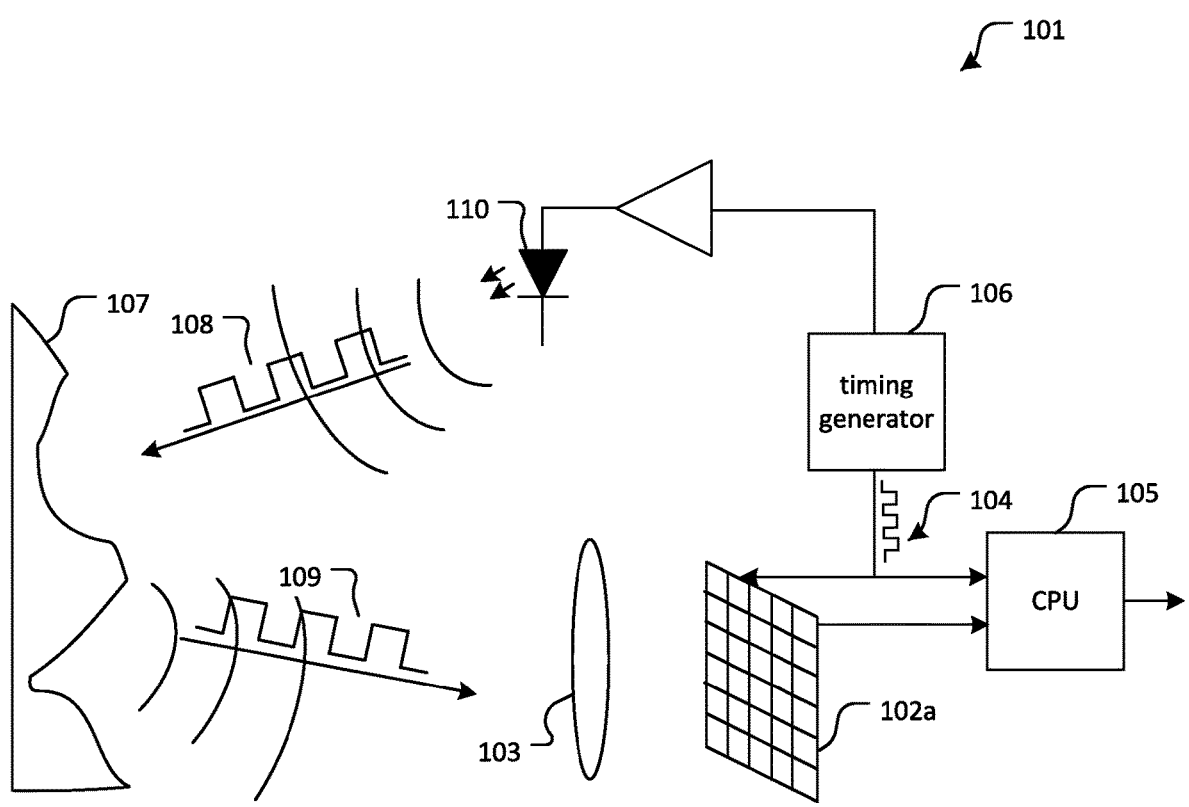
FIG. 1 schematically shows the basic operational principle of an indirect Time-of-Flight imaging system, which can be used for depth sensing or providing a distance measurement.

Before a detailed description of the embodiments under reference of FIG. 1, general explanations are made.

The embodiments described below in more detail disclose an electronic device comprising circuitry configured to disambiguate a first phase delay obtained according to an indirect Time-of-Flight principle, wherein the circuitry is configured to disambiguate the first phase delay based on a captured spot position.

The captured spot position may for example relate to a spot produced by a spot illuminator. A spot produced by a spot illuminator may be any (small) area visibly different (confidence, amplitude) from the surrounding area, for example a high intensity (with regards to amplitude) area. The spot may for example have a rectangular shape (with straight or round edges), a dot shape or the like.

The captured spot position may for example be expressed as a coordinate within a coordination system of an image sensor of the iToF system.

Circuitry may include a processor (CPU), a memory (RAM, ROM or the like), a DNN or GPU unit, a storage, input means (mouse, keyboard, camera, etc.), output means (display (e.g., liquid crystal, (organic) light emitting diode, etc.), loudspeakers, etc., a (wireless) interface, etc., as it is generally known for electronic devices (computers, smartphones, etc.)).

According to an embodiment the circuitry may be configured to determine a spot disparity based on the spot position and to disambiguate the first phase delay based on the spot disparity.

According to an embodiment the circuitry may be configured to determine the spot disparity based on the spot position and based on a reference position of the spot.

A reference position may for example be a coordinate of a calibration measurement of a spot within a coordination system of an image sensor of the iToF system.

The spot disparity (or spot displacement) may be the difference between the coordinate of the reference position of the spot and the coordinate of the captured spot position.

The reference position may in particular be an expected position which is for example obtained by calibration.

The reference position may for example be expressed as a coordinate of a captured spot within a coordination system of an image sensor of the iToF system.

According to an embodiment the circuitry may be configured to retrieve the predefined reference position from a memory.

For example, the expected position may be obtained by a calibration measurement. The expected position of the spot may be for example be measured with a baseline distance (B) of approximately zero and/or with the object (also called calibrating plane) being far away.

According to an embodiment the circuitry may be configured to determine that the first phase delay is outside an unambiguous range if the position of the captured spot is equal to the reference position of the spot with regards to the same coordinate system.

An unambiguous range may a range expressed in metric units, for example meters. The unambiguous range may be a range, such that within this range a distance measurement or a phase delay measurement, according to the iToF principle, is unambiguous.

According to an embodiment the circuitry may be configured to determine the unambiguous phase delay for the spot as identical to the first phase delay if the first phase delay is inside an unambiguous range.

According to an embodiment the circuitry may be configured to determine that the first phase delay is inside an unambiguous range if the position of the captured spot is equal to the reference position of the spot.

The position of the captured spot may be equal to the reference position of the spot if the difference of the coordinate of the reference position of the spot and the coordinate of the captured spot may be zero (in a global coordinate system). The difference of the coordinate of the reference position of the spot and the coordinate of the captured spot may be the disparity or the spot displacement.

According to an embodiment the circuitry may be configured to determine the unambiguous phase delay for the spot as $2\pi$+the first phase delay, if the first phase delay is outside an unambiguous range.

According to an embodiment the circuitry may be configured to determine an unambiguous distance of the spot based on the unambiguous phase delay.

According to an embodiment the electronic device may further comprise an iToF image sensor and the circuitry may be configured to determine the first phase delay from a phase image obtained with the iToF image sensor. The phase image may comprise a first phase delay value for each pixel corresponding to a spot or for each pixel within the iToF image sensor.

According to an embodiment the electronic device may further comprise the spot illuminator wherein the spot illuminator may be configured to produce a pattern of light spots, and wherein the circuitry may be configured to disambiguate a phase measurement for each spot produced by the spot illuminator.

According to an embodiment the circuitry may be configured to perform image analysis on the iToF confidence image or on the amplitude image comprises a local maximum search.

The local maxima search may comprise finding one pixel within the image sensor which corresponds to a spot, for example the center of a spot.

According to an embodiment a system may comprise a spot illuminator, an image sensor and the electronic device, wherein the spot illuminator and the image sensor may be spaced apart by a baseline distance, and wherein the spot disparity may depend on the baseline distance.

For a fixed object distance, the spot disparity may become larger if the baseline distance becomes larger. This may be used to tune the system for different application purposes.

According to an embodiment the circuitry may configured to determine an object distance based on the spot disparity based on the baseline distance and based on a modulation frequency, and to disambiguate the first phase delay based on the object distance (Z).

According to an embodiment an unambiguous range is based on a modulation frequency.

The modulation frequency may be the same frequency as the demodulation frequency.

The embodiments described below in more detail also disclose a method comprising disambiguating a first phase delay obtained according to an indirect Time-of-Flight principle to obtain a second phase measurement wherein the disambiguating the phase measurement is based on a captured spot position.

The captured spot position may relate to a spot produced by a spot illuminator.

According to an embodiment the method may comprise performing a calibration measurement to obtain a reference position. Determining the spot disparity may be based on the spot position and the reference position.

According to an embodiment the reference position of the spot may be measured with a baseline distance of approximately zero and/or with the object being far away.

Embodiments are now described by reference to the drawings.

Operational Principle of an Indirect Time-of-Flight Imaging System (iToF)

FIG. 1 schematically shows the basic operational principle of an indirect Time-of-Flight imaging system which can be used for depth sensing. The iToF imaging system 101 includes an iToF camera, with an imaging sensor 102*a* having a matrix of pixels and a processor (CPU) 105. A scene 107 is actively illuminated with amplitude-modulated infrared light 108 at a predetermined wavelength using an illumination unit 110, for instance with some light pulses of at least one predetermined modulation frequency generated by a timing generator 106. The amplitude-modulated infrared light 108 is reflected from objects within the scene 107. A lens 103 collects the reflected light 109 and forms an image of the objects within the scene 107 onto the imaging sensor 102*a*. In indirect Time-of-Flight (iToF) the CPU 105 determines for each pixel a phase delay between the modulated light 108 and the reflected light 109.

This may be achieved by sampling a correlation wave between a demodulation signal 104 generated by a timing generator 106 and reflected light 109 that is captured by each respective pixel of the imaging sensor 102a and by sampling for each pixel a correlation wave between one or more shifted demodulation signals generated by the timing generator 106 (for example shifted about 0°, 90°, 180° and 270°) and the reflected light 109 that is captured by each respective pixel of the imaging sensor 102a. This yields an in-phase component value ("I value") for and quadrature component value ("Q-value") for each pixel, so called I and Q values. Based on the I and Q values for each pixel a phase delay value φ for each pixel may be determined as $$\varphi = \arctan\frac{I}{Q},$$

which yields a phase image. The phase delay φ is proportional to the object's distance modulo the wavelength of the modulation frequency. The depth image can thus be determined directly from the phase image. Still further, based on the I and Q values an amplitude value and a confidence conf value may be determined for each pixel as conf=|I|+|Q| which yields the amplitude image and the confidence image.

The "Wrapping" Problem

In iToF systems, the distance is a function of the phase difference between the emitted and received modulated signal. This is a periodical function with period 2π. Different distances will produce the same phase measurement. This is called aliasing or phase wrapping. A phase measurement produced by the iToF camera is "wrapped" into a fixed interval, i.e., [0,2π], such that all phase values Φ corresponding to a set {Φ|Φ=2kπ+φ, k∈Z} become φ, where k is called "wrapping index". In terms of depth measurement, all depths are wrapped into an interval that is defined by the modulation frequency. In other words, the modulation frequency sets an unambiguous operating range $Z_{Unambiguous}$ as:

$$Z_{Unambiguous} = \frac{c}{2 \cdot f_{mod}}$$

with c being the speed of light, and $f_{mod}$ the modulation frequency. For example, for an iToF camera having a modulation frequency 20 MHz, the unambiguous range is 7.5 m.

Figure 2A:
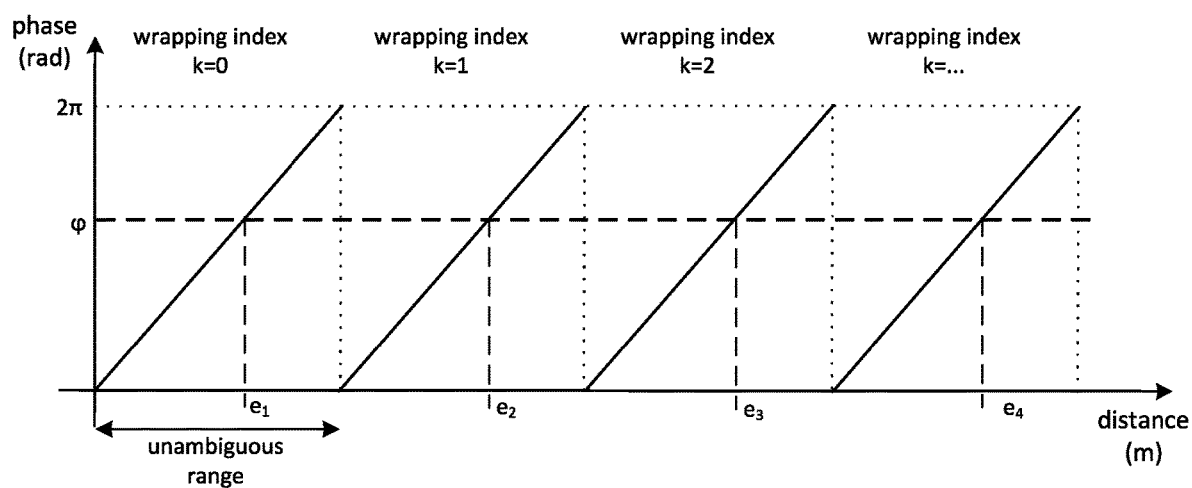
FIG. 2a schematically illustrates in diagram this wrapping problem of iToF phase measurements.

FIG. 2a schematically illustrates in diagram this wrapping problem of iToF phase measurements. The abscissa of the diagram represents the distance (true depth or unambiguous distance) between an iToF pixel and an object in the scene, and the ordinate represents the respective phase measurements obtained for the distances. The horizontal dotted line represents the maximum value of the phase measurement, 2π, and the horizontal dashed line represents an exemplary phase measurement value φ. The vertical dashed lines represent different distances $e_1$, $e_2$, $e_3$, $e_4$ that correspond to the exemplary phase measurement φ due to the wrapping problem. Thereby, any one of the distances $e_1$, $e_2$, $e_3$, $e_4$ corresponds to the same value of φ. The distance $e_1$ can be attributed to a wrapping index k=0, the distance $e_2$ can be attributed to a wrapping index k=1, the distance $e_3$ can be attributed to a wrapping index k=2, and so on. The unambiguous range defined by the modulation frequency is indicated in FIG. 2a by a double arrow and is 2π.

Figure 2B:
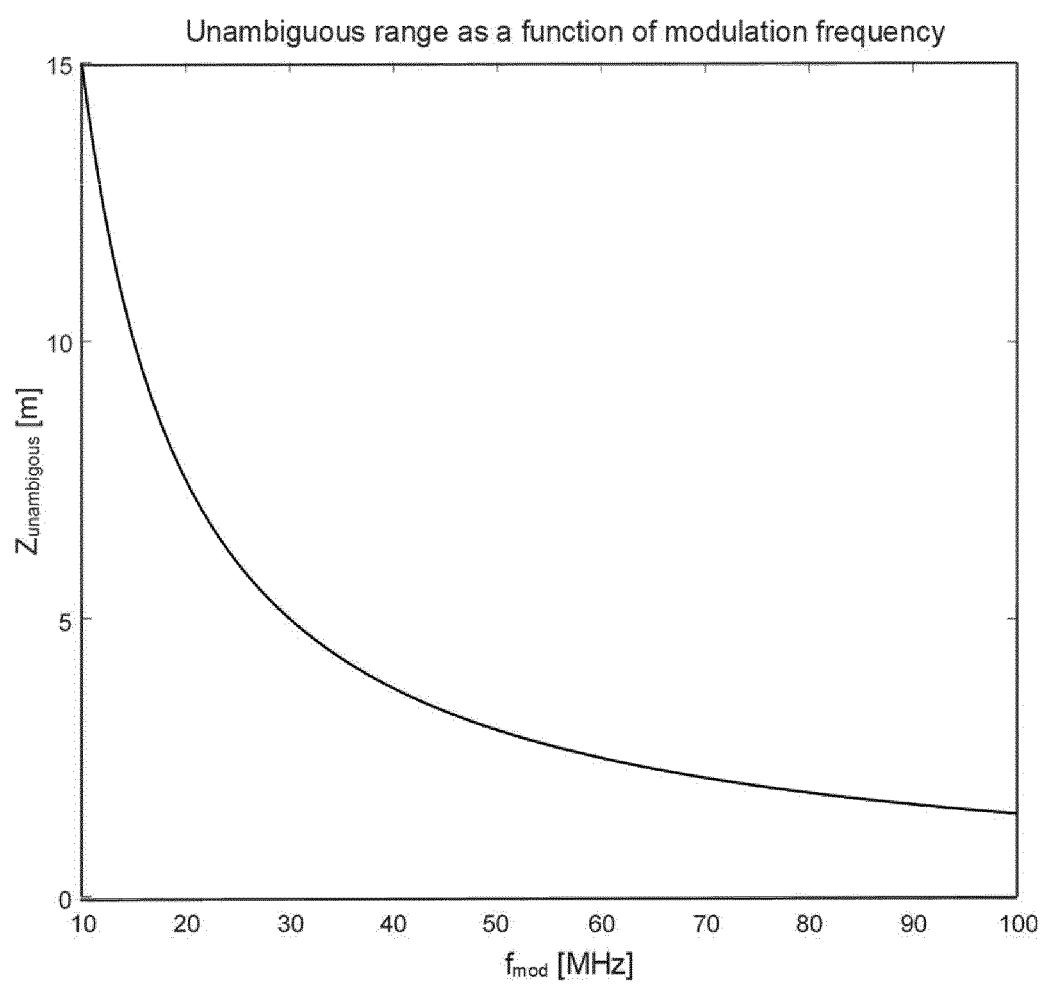
FIG. 2b schematically shows the unambiguous range of a spot ToF imaging system as a function of the modulation frequency of the of the spot ToF imaging system.

FIG. 2b schematically shows the unambiguous range of a spot ToF imaging system as a function of the modulation frequency of the spot ToF imaging system. The x-axis of the diagram shows the distance of the modulation frequency $f_{mod}$ from 10 MHz to 100 MHz. The y-axis of the diagram shows the unambiguous range $Z_{Unambiguous}$ from zero meter to 15 meters.

For different modulation frequencies $f_{mod}$ different unambiguous ranges are obtained, for example, for a modulation frequency $f_{mod}$=10 MHz the unambiguous range is $Z_{Unambiguous}$=15 m or for a modulation frequency $f_{mod}$=100 MHz the unambiguous range is $Z_{Unambiguous}$=1.5 m. That means that in case of a modulation frequency $f_{mod}$=30 MHz the unambiguous range is $Z_{Unambiguous}$=5 m and objects with an object distance larger than 5 m away will be aliased back, and the measured object distance Z may be wrong.

The ambiguity concerning the measured and the true distance when aliasing/wrapping occurs can be resolved by inferring the correct wrapping index (disambiguation) for each pixel from other information. This process of resolving the ambiguity is called "unwrapping".

Existing methodologies use more than one frequency (for example two) and extend the unambiguous range by lowering the effective modulation frequency, for example, using the Chinese Remainder Theorem (NCR Theorem), as described in published paper A. P. P. Jongenelen, D. G. Bailey, A. D. Payne, A. A. Dorrington, and D. A. Carnegie, "Analysis of Errors in ToF Range Imaging With Dual-Frequency Modulation," IEEE Transactions on Instrumentation and Measurement, vol. 60, no. 5, pp. 1861-1868, May 2011. Multi-frequency captures, however, are slow as they require the acquisition of the same scene over several frames. Therefore, they are subjected to motion artefacts, and thus, limit the frame rate and motion robustness of iToF sensors, especially in case where the camera, the subject/object, the foreground or the background move during the acquisition.

In a case of dual frequency measurements, for example, a pair of frequencies such as 40 MHz and 60 MHz are used to resolve the effective frequency of 20 MHz=GreatestCommonDivisor (40 MHz, 60 MHz), which corresponds to an effective unambiguous range of 7.5 m. The unwrapping algorithm, in the dual frequency approaches, is straightforward and computationally lightweight, so that it can run real-time. This NCR algorithm operates per-pixel, without using any spatial priors, therefore, it does not leverage the recognition of features/patterns in the depth image and/or side-information, and thus, the NCR algorithm cannot unwrap beyond the unambiguous range.

In addition, the presence of noise may make more difficult to disambiguate between wrapping indexes, as the true depth may correspond to more than one wrapping index, as described above. However, these techniques require several full calculations, and a disambiguation calculation and are therefore inherently multiplying the processing power needed to achieve one measurement.

Another method for solving the ambiguity problem of a spot time of flight (see FIG. 3) with a spot illuminator (see FIG. 4) by exploiting a spot displacement (disparity) is described below (see FIGS. 8 and 11).

Spot Time-of-Flight (Spot ToF)

The illumination unit of a ToF imaging system (110 in FIG. 1) may be configured to illuminate a scene (107 in FIG. 1) with a pattern of light spots. The light pattern of spots may be a pattern of (separated) high-intensity areas (i.e., light spots) and low-intensity light areas (valleys) such as, for example, a pattern of light dots, in which case the iToF is called a spot ToF.

Figure 3:
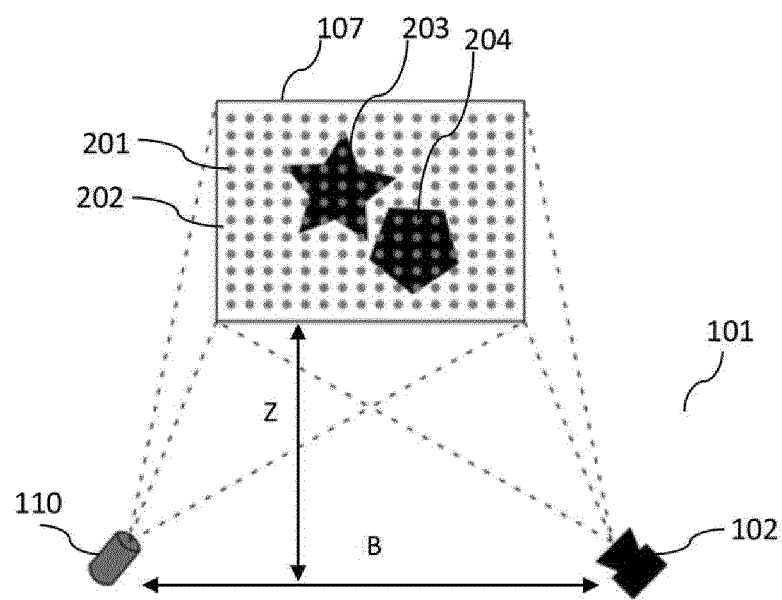
FIG. 3 shows an embodiment of the iToF imaging system of FIG. 1, operated as a spot ToF imaging system.

FIG. 3 schematically shows a spot ToF imaging system which produces a spot pattern on a scene. The spot ToF imaging system comprises an illumination unit 110, here a spot illuminator, which produces a pattern of spots 202 on a scene 107 comprising objects 203 and 204. An iToF camera 102 captures an image of the spot pattern on the scene 107. The pattern of light spots projected onto the scene 107 by illumination unit 110 results in a corresponding pattern of light spots in the confidence image and depth image captured by the pixels of the image sensor (102a in FIG. 1) of iToF camera 102. The light spots will appear in the confidence image produced by iToF camera 102 as a spatial light pattern including high-intensity areas 201 (the light spots), and low-intensity areas 202.

In the embodiment of FIG. 3, the illumination unit 110 is positioned in the plane of the image sensor (102a in FIG. 1) of iToF camera 102. This plane is also called ToF plane. The illumination unit 110 and the iToF camera 102 are positioned at a distance B from each other. This distance B is called baseline. The scene 107 has distance Z from baseline B. In the embodiment of FIG. 1, for simplification, only a single distance Z of the scene 107 is shown. However, every object 203, 204 or object point within the scene 107 may have an individual distance Z from baseline B. The depth image of the scene captured by ToF camera 102 defines a depth value for each pixel of the depth image and thus provides depth information of scene 107 and objects 203, 204. According to the principles of disparity (see FIG. 6a), the positions of the spots as captured by the camera 102 shift within the depth image produced by iToF camera 102 when the baseline distance B and/or the object distance Z is changed. In the embodiments described below in more detail, this disparity effect is used to disambiguate the distance/phase delay measurements produced by iToF camera 102.

In the embodiment of FIG. 1, the light spots produced by illumination unit 110 (e.g., a spot illuminator, an edge emitting laser, a LED, etc.) are shown as dots and they have a circular shape. The embodiments are, however, not restricted to such dots. In alternative embodiments, the light spots produced by illumination unit 110 may have a rectangular or square shape or any other regular or irregular shape. In particular, the light spots may have a spatial light intensity profile, for example, a Gaussian light intensity profile or the like. Still further, in the embodiment of FIG. 1, the light spots produced by illumination unit 110 are shown as a regular grid pattern. However, in alternative embodiment, the spot pattern produced by illumination unit 110 may be an irregular pattern.

Figure 4:
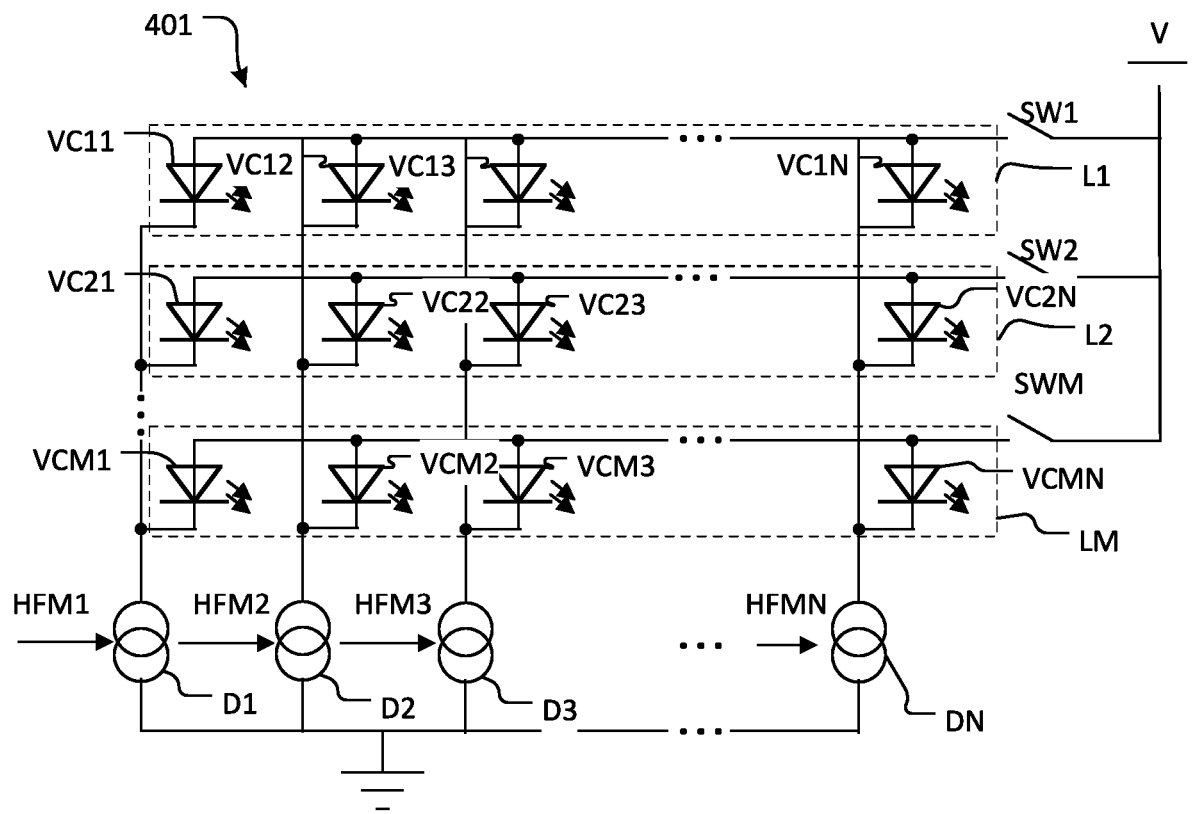
FIG. 4 schematically illustrates an embodiment of a VCSEL illuminator comprising a vertical cavity surface emitting laser (VCSEL) array, column drivers and row enable switches for spot scanning illuminator.

FIG. 4 schematically illustrates an example of a spot illuminator 110 as used in FIG. 3. The spot illuminator of FIG. 4 comprises an array of vertical cavity surface emitting lasers, VCSEL, column drivers and row enable switches for spot scanning. The VCSEL illuminator (also called spot illuminator) 401 comprises an array of VCSELs VC1N-VCMN which are grouped in M sub-sets L1-LM, N drivers D1, D2, . . . , DN for driving the VCSEL array, and M switches SW1-SWM, where N and M may for example be a number between 2 to 16 or any other number. Each VCSEL VC1N-VCMN may have an illumination power of 2 W to 10 W. In this embodiment the sub-sets L1-LM are the rows of the VCSEL array. The VCSELs VC11, VC12, . . . , VC1N, VC14 of the first sub-set L1 are grouped in the first electrical line zone. The VCSELs VC21, VC22, VC23, . . . , VC2N of the second sub-set L2 are grouped in the second electrical line zone. The VCSELs VC31, VC32, VC33, . . . , VC3N of the Mth sub-set LM are grouped in the third electrical line zone. Each electrical line zone is electrically connected to the respective driver D1, D2, . . . , DN and via the respective switches SW1-SWM to a supply voltage V. The supply voltage V supplies the power for generating a driving current, where the driving current is the current that is applied to the drivers D1, D2, . . . , DN and to the VCSEL array by turning on/off the respective switch SW1-SWM. Each driver D1, D2, . . . , DN receives a respective high modulation frequency signal HFM1, HFM2, . . . , HFMN to drive the VCSEL illuminator 401.

Each controllable node of the illuminator 401 forms a spot beam (not shown in FIG. 4), where the spot beams are not overlapping. Each spot beam may for example have a different phase offset or all may have the same phase. A diffractive optical element (DOE) (not shown in FIG. 1) is disposed in front of the VCSEL array 401 in order to shape and split the VCSEL beams in an energy-efficient manner. A DOE may be a micro lens.

An iToF camera determines a confidence image (or alternatively amplitude image) of the scene. The confidence image comprises a confidence value for each pixel within the image sensor.

Typically, the pattern of light spots projected onto the scene (107 in FIG. 3) by a spot illuminator (110 in FIG. 3, FIG. 4) result in a corresponding pattern of light spots in the confidence image and depth image captured by the pixels of the image sensor (102a in FIG. 1). The spots appear in the confidence image produced by iToF camera (102 in FIG. 3) as a spatial light pattern including high-intensity areas 201 (the light spots), and low-intensity areas (202 in FIG. 3). In the following, the high-intensity area 201 defining a spot is also denoted as "spot region".

Figure 5:
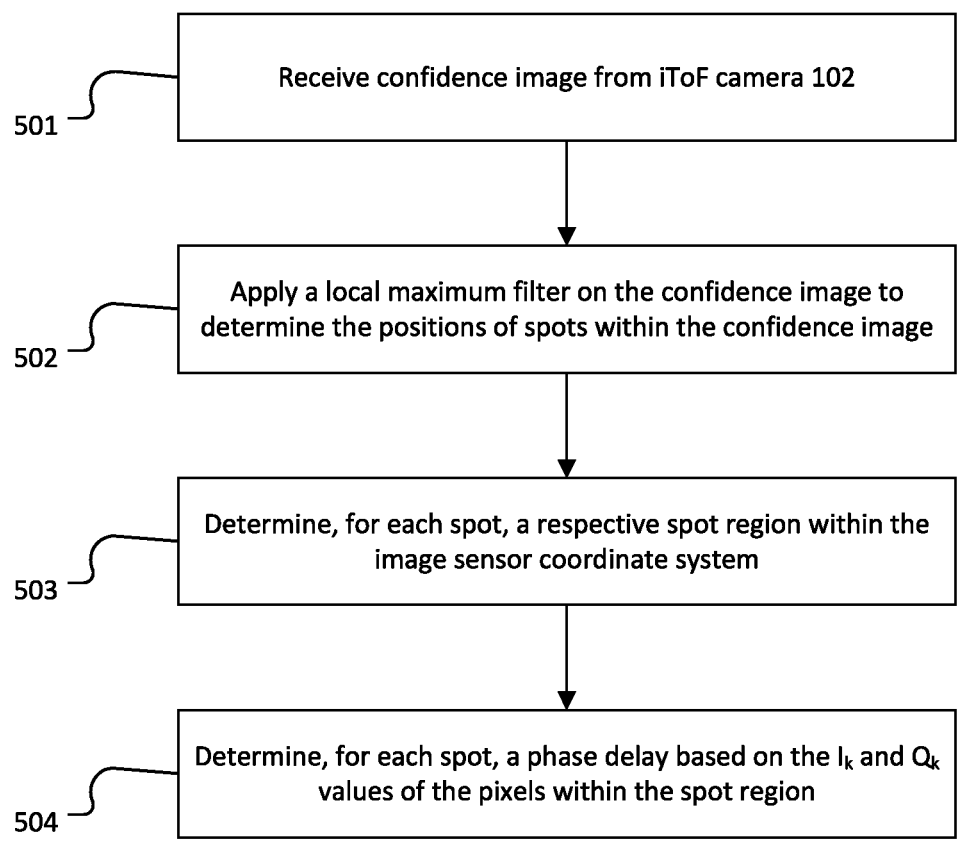
FIG. 5 shows a flow chart of a spot ToF processing.

FIG. 5 shows a flow chart of a spot ToF processing. At 501, a confidence image captured by an iToF camera is received. At 502, a local maximum filter is applied on the confidence image to determine the positions of spots within the confidence image. The local maximum filter, which is generally known to the skilled person (c.f. the "peak_local_maxima" function from "scikit-image", phyton image processing documentation Number "0.19.0.dev0": https://scikit-image.org/docs/dev/auto_examples/segmentation/plot_peak_local_max.html, last opened on 26.01.2021) determines the pixels which have a phase amplitude value corresponding to a local maximum (i.e. the spot peak pixels). At 503, for each spot, a spot region is determined within the image sensor coordinate system in order identify all pixels that relate to the spot. At 504, a phase delay value for each spot is determined based on the $I_k$ and $Q_k$ values of the pixels within the spot region.

The determining of a phase delay for a spot at 504 may for example be realized by computing the average phase delay of all pixels with the spot region of the respective spot.

The image sensor coordinate system may be a pixel coordinate system which identifies each pixel with a pair of indices (i,j) indicating the row i and the column j within the image sensor starting with (1,1) in the upper left corner. In another embodiment the image sensor coordinate system may be a pixel coordinate system which identifies each pixel with a one number i indicating the number of the pixel ranging from one to the number of pixels, when counted for example from the first row from left to right, then the second row from left to right until the last pixel on right of the last row.

The position of the captured spots may be determined anyway for a spot ToF system and thereby the disparity (spot displacement) may be obtained without any additional computational effort.

Spot Disparity

As stated above with regard to FIG. 3, according to the principles of disparity the positions of the spots as captured by an iToF camera (102 in FIG. 3) shift within the depth image produced by an iToF camera when the baseline distance B and/or the object distance Z is changed.

Figure 6A:
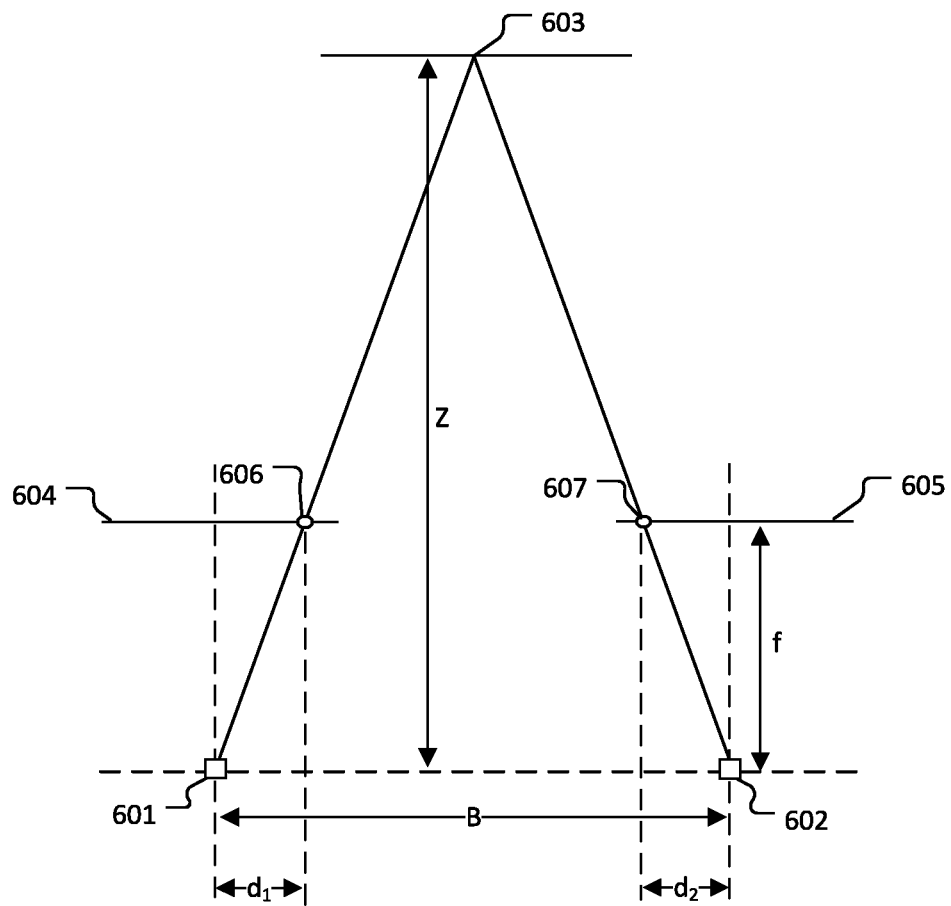
FIG. 6a schematically describes the basic principle of the spot displacement.

FIG. 6a schematically describes the relation between distance and disparity. It uses a pinhole model for an iToF camera and a spot illuminator. A position 601 of the pinhole (focal point) of the spot illuminator and a position 602 of the pinhole (focal point) of the iToF camera are separated by baseline B. An image plane 605 of the iToF camera is schematically shown in front of the iToF camera position 602 at a distance f from the baseline B. Similarly, a projection plane 604 of the spot illuminator is schematically shown in front of the spot illuminator position 602 at a distance f from the baseline B.

The spot illuminator produces a spot 603 within a scene. The spot 603 produced by the spot illuminator has an object distance Z with respect to baseline B. The line of sight defined by spot 603 and illuminator position 601 intersects the projection plane 604 of the spot illuminator at position 606. This position 606 is represented by a distance $d_1$ within the projection plane 604, measured from the centre of the illuminator plane 604 (see dashed line going vertically through the projection plane 604). Distance $d_1$ corresponds to a beam direction at which the respective spot beam of the spot illuminator (see FIG. 4) is orientated (see FIG. 12 and corresponding description). Spot 603 produced by the spot illuminator is captured by the iToF camera. The line of sight defined by spot 603 and camera position 602 intersects the image plane 605 of the camera at position 607. This position 607 is represented by a distance $d_2$ within the image plane 605, measured from the centre of the image plane 605 (see dashed line going vertically through the image plane 605). Distance $d_1$ which represents position 606 and distance $d_2$ which represents position 607 provide disparity information. A disparity d related to the spot 603 as it is seen by the camera and produced by the illuminator can be defined as:

$$d = d_1 - d_2.$$

FIG. 6a provides a schematic illustration in two dimensions. The abscissa represents a horizontal position ($d_1$, $d_2$) and the ordinate a distance (Z). The same principles apply in real space which has three dimensions. In three dimensions, the "horizontal" position of the spot in the image plane (the "x coordinate" of the pixel in the sensor plane) is relevant. The position of the spot in vertical direction (the "y coordinate" of the pixel in the sensor plane) is not relevant for determining disparity and can thus be disregarded.

According to the general principle of disparity as shown in FIG. 6a it can be derived the stereo geometry equation $$\frac{d}{f} = \frac{B}{Z} \Leftrightarrow d = \frac{f \cdot B}{Z}$$

That is, the disparity d (or, accordingly, the disparity information $d_2$) of spot 603 as seen by an iToF camera changes when the baseline distance B and/or the object distance Z is changed.

The disparity d can also be expressed in pixels instead of metric units $$\Delta px = \frac{d}{p} = \frac{f \cdot B}{p \cdot Z}$$

where $\Delta px$ is the number of pixels corresponding to the disparity value d in the image plane (sensor plane), and p is the pixel pitch (i.e., the distance between pixel centers on the sensor).

From this equation it can be seen that when the baseline distance B between the camera and the illuminator is very small (approximately zero) or when the distance Z between the camera and the object is very large (approximately infinity) then the disparity d is very small (approximately zero). If is the baseline B between the camera and the illuminator is large or if an object is close to the baseline B so that distance Z is small, then there will be a significant disparity, i.e., spot displacement visible.

Figure 6B:
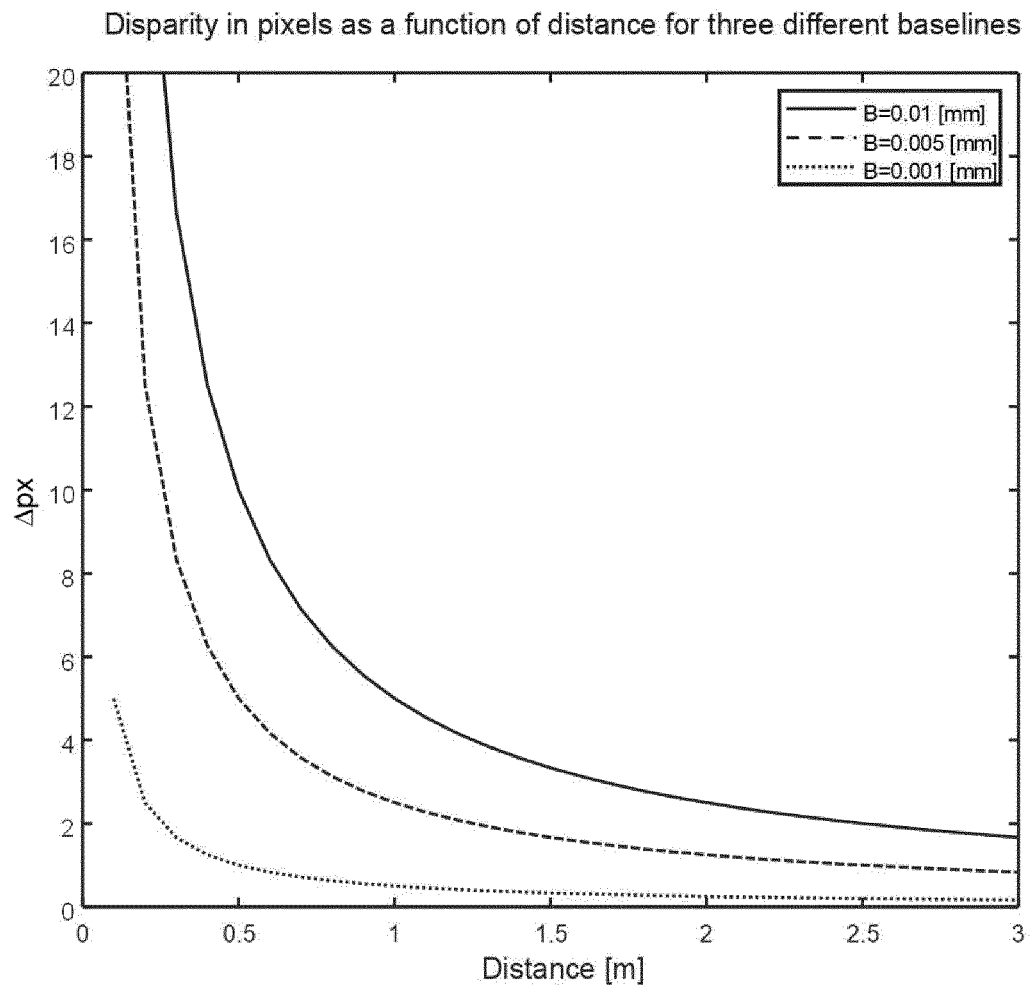
FIG. 6b schematically shows the relation between the disparity (in number of pixels) and the object distance Z for different baseline distances B.

FIG. 6b schematically shows the relation between the disparity (in number of pixels) and the object distance Z for different baseline distances B. The x-axis of the diagram shows the distance of the object Z from zero meters to three meters. The y-axis of the diagram shows the measured disparity in pixels from zero pixels to 20 pixels. The solid line shows the relation between the disparity and the object distance Z for a baseline distance of 0.01 mm. For this baseline distance of 0.01 mm for example an object distance of 0.5 m results in a disparity of 10 pixels. The long-dashed line shows the relation between the disparity and the object distance Z for a baseline distance of 0.005 mm. For this baseline distance of 0.005 mm for example an object distance of 0.5 m results in a disparity of 5 pixels. The short-dashed line shows the relation between the disparity and the object distance Z for a baseline distance of 0.001 mm. For this baseline distance of 0.001 mm for example an object distance of 0.5 m results in a disparity of 1 pixel.

Resolving the "Wrapping" Problem with Disparity Information

As described above, when measuring a phase delay and thereby the distance of an object in a spot ToF/iToF system the measurement may be ambiguous (or aliased, also called the phase ambiguity problem or "wrapping" problem).

In the embodiments described below in more detail, this wrapping problem is solved by taking into account the spot displacement (disparity) to distinguish between a small number of actual distance candidates in the camera range (see $e_1$ to $e_4$ in FIG. 2a). That is, the disparity d or any disparity information contributing to the disparity d (e.g., $d_2$ in FIG. 6a) are used to disambiguate a distance/phase delay measurement produced by an iToF camera.

Figure 7:
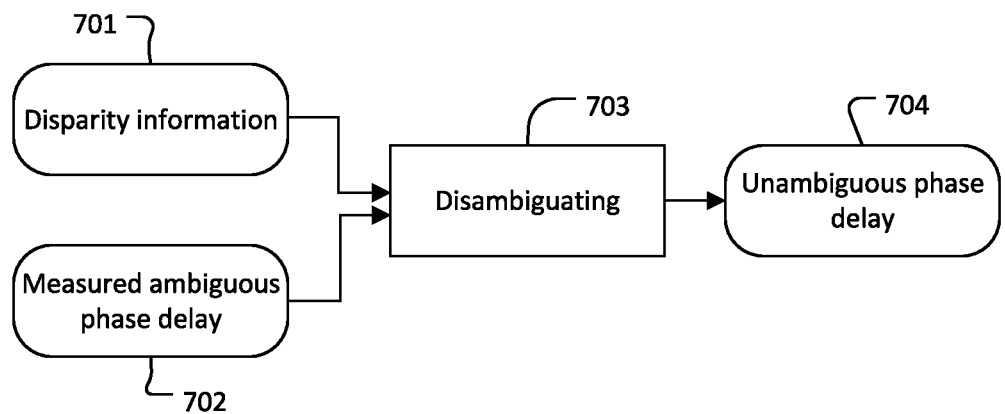
FIG. 7 schematically describes a disambiguating of a measured ambiguous phase delay.

FIG. 7 schematically describes a disambiguating process. The disambiguating process 703 receives a disparity information 701 of a spot and a measured ambiguous phase delay 702 of the dot and outputs an unambiguous phase delay 704 of the spot. The disparity information 701 of the spot quantizes the amount of the displacement in the position of the dot as perceived by the image sensor (i.e., the stereo principle as described above in FIG. 6a). For example, the disparity information may be determined based on a difference between a reference position of the dot and the measured position of the dot (in the same coordinate system).

The disparity information 701 (spot displacement) for each spot may for example be classified into a predetermined number of different spot displacement classes, where each spot displacement class corresponds to a specific wrapping index (see FIG. 2a). The spot displacement class (or the wrapping index) determines the unambiguous (true) distance of the object.

For example, the unambiguous phase delay 704 of the spot may be unambiguous within at least two times the unambiguous range. If two spot displacement classes are used, these may for example be denoted as a first class "inside the unambiguous range" (corresponding to wrapping index k=0) and a second class "outside the unambiguous range" (corresponding to wrapping index k=1).

For example, every spot whose spot displacement is zero (or at least below 1 pixel) may be classified into class "outside the unambiguous range" (corresponding to wrapping index k=1) and every spot whose spot displacement is above one pixel may be classified into class "inside the unambiguous range" (corresponding to wrapping index k=0). In this example, a spot which is located more than two times the unambiguous range away from the baseline would also be classified into the second class "outside the unambiguous range" (corresponding to wrapping index k=1).

As can be seen in FIG. 6b, for larger baseline distances B the same object distance Z results in a larger disparity. This means that a spot ToF imaging system with a larger baseline distance B has a larger "disparity resolution" and can thus resolve an ambiguity problem even for larger object distances Z.

The baseline B of an iToF camera system with spot illuminator may for example be configured such that at a given object distance $Z=Z_{Unambiguous}$, the disparity $\Delta px$ is close to 1 pixel:

$$B = \frac{pZ_{Unambiguous}\Delta px}{f}\bigg|_{\Delta px=1} = \frac{pZ_{Unambiguous}}{f}$$

If the iToF camera system is configured with this baseline B, a spot with $\Delta px<1$ will indicate an object distance $Z>Z_{Unambiguous}$ (i.e. falling outside the unambiguous range). Such a spot ToF system is tuned to disambiguate objects up to one unambiguous range.

It is also possible to disambiguate objects up to more than one unambiguous range by changing the modulation frequency $f_{mod}$ as described in FIG. 2b.

Figure 8:
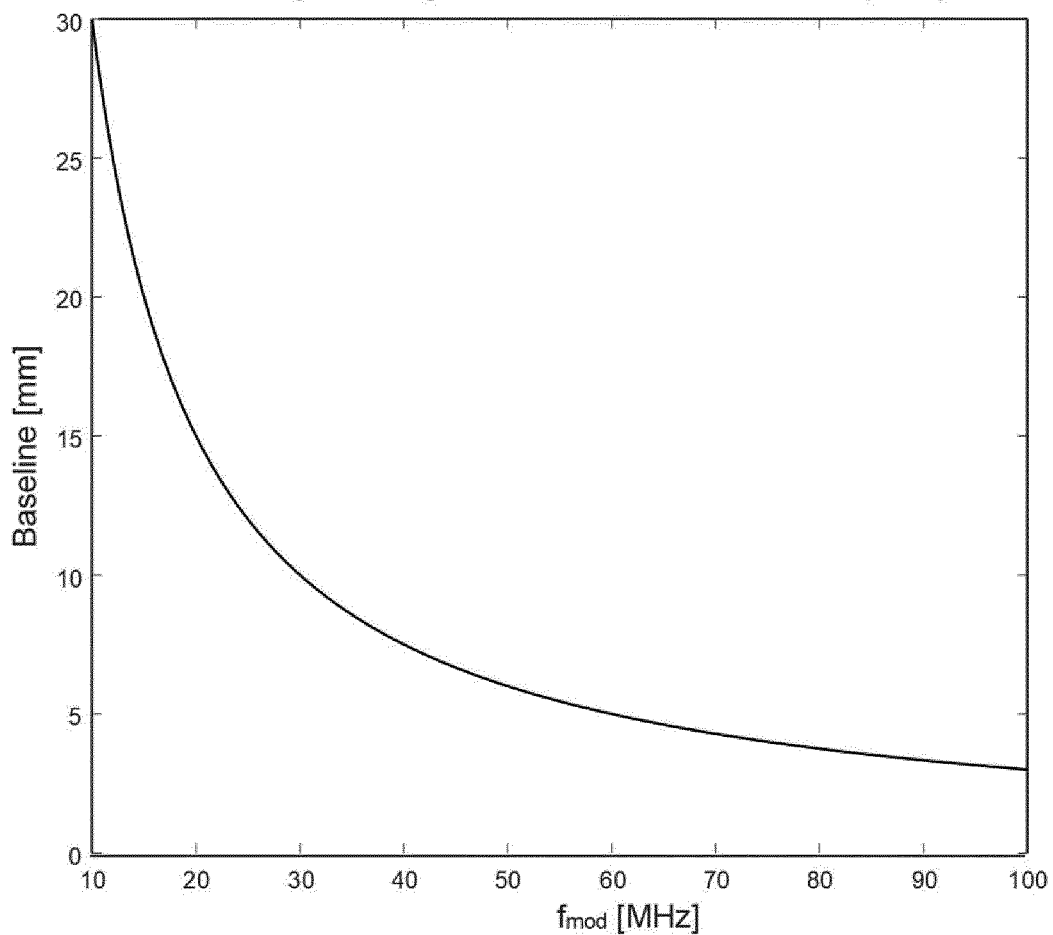
FIG. 8 schematically shows the minimal baseline distance needed to disambiguate objects up to one unambiguous range as a function of the modulation frequency of a spot ToF system.

FIG. 8 schematically shows the minimal baseline distance needed to disambiguate objects up to one unambiguous range as a function of the modulation frequency of a spot ToF system. The x-axis of the diagram shows the distance of the modulation frequency $f_{mod}$ from 10 MHz to 100 MHz. The y-axis of the diagram shows the baseline distance B from zero mm to 30 mm. For example, for a modulation frequency $f_{mod}$=30 MHz the baseline distance may be set B=10 mm to disambiguate objects with an object distance Z up to one time the unambiguous range $Z_{Unambiguous}$ and the baseline distance B may be chosen larger if objects with an object distance Z up to two times or more of the unambiguous range $Z_{Unambiguous}$ should be disambiguated.

The disambiguating of the phase measurement can reduce the needed power, increase the frame rate, or both, and it can also increase the motion robustness.

Figure 9:
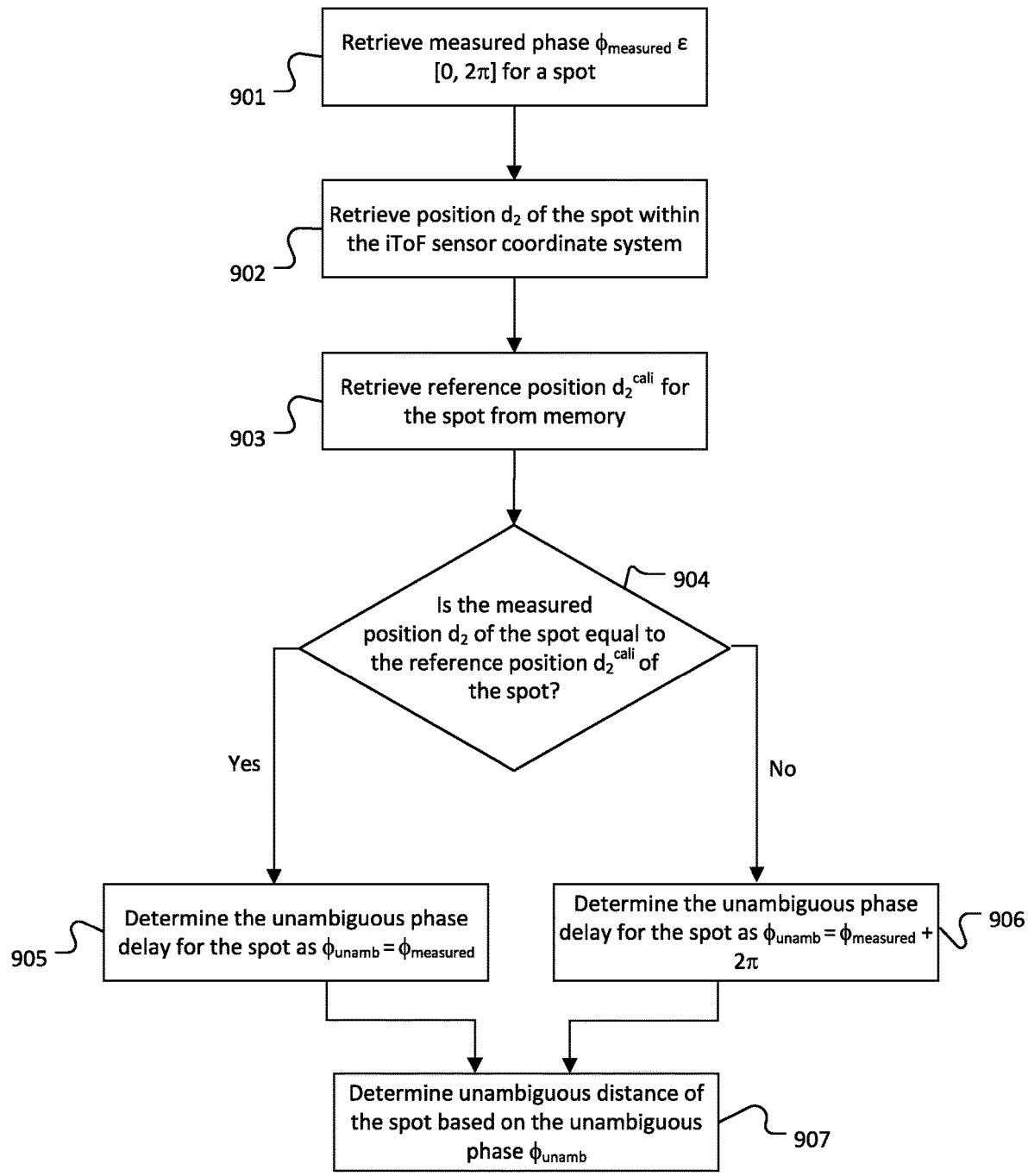
FIG. 9 schematically shows a flow chart of process of iToF phase disambiguation which evaluates disparity by comparing an actual spot position with an expected spot position.

Evaluating Disparity by Comparing an Actual Spot Position with an Expected Spot Position FIG. 9 schematically shows a flow chart of process of iToF phase disambiguation which evaluates disparity by comparing an actual spot position with an expected spot position. At 901, a measured phase delay (first phase delay) of a spot $\varphi_{measured} \in [0, 2\pi]$ is retrieved (see 504 in FIG. 5 and corresponding description). At 902, a measured position $d_2$ of the spot within the iToF image sensor coordinate system is retrieved (see 502 in FIG. 5 and corresponding description). This measured position can also be called "actual location" of a spot. At 903, a reference position $d_2^{cali}$ for the spot is retrieved from a memory (this may be done by measuring the distance of the actual spot to the closet expected spot). The distance is calculated as the Euclidean distance of the two points using its coordinates. This reference position $d_2^{cali}$ can also be called an "expected location" of the spot. The reference position may for example be a predefined position that has been obtained in advance by calibration, e.g., by the calibration process described in FIG. 10. At 904, it is checked if the measured position of spot $d_2$ is equal to its reference position $d_2^{cali}$. The positions may for example be considered as equal if they correspond to the same pixel within the image sensor coordinate system. In other words, at 904, it is checked if the spot displacement (disparity) $d=d_2^{cali}-d_2$ between the detected position $d_2$ of the spot and the reference position $d_2^{cali}$ of the spot is zero or below one pixel. If the answer in 904 is yes, which means that that there is no spot displacement (disparity is below one pixel), it is continued at 905. At 905, an unambiguous phase delay $\varphi_{unamb}$ (second phase delay) for the spot is determined as $\varphi_{unamb}=\varphi_{measured}$ because the spot was found to be within the unambiguous range and it is continued at 907. If the answer in 904 is no, which means that a spot displacement is visible (disparity is equal to or larger than one pixel), it is continued at 906. At 906, the unambiguous phase delay $\varphi_{unamb}$ of the spot is determined as $\varphi_{unamb}=\varphi_{measured}+2\pi$ because the spot was found to be outside the unambiguous range and it is continued at 907. At 907, the unambiguous distance Z (depth) of the spot is determined based on the unambiguous phase delay $\varphi_{unamb}$ as $Z=(\varphi_{unamb} \cdot Z_{Unambiguous})/2\pi$, where $Z_{Unambiguous}$ is the unambiguous range as defined in FIG. 2 (for example in meters).

Preferably, the detected position $d_2$ of the spot and its reference position $d_2^{cali}$ are expressed in the coordinate system of the image sensor. However, other coordinate systems may be used to represent the positions $d_2$ and $d_2^{cali}$. For example, the coordinates $d_2^{cali}$ and $d_2$ may both be expressed in a global coordinate system.

The process in FIG. 9 is described for one spot. This process may be repeated for each spot that is captured by the image sensor of the iToF camera. For example, a sparse sampling grid pattern of light spots may be imposed on a scene by a spot illuminator as described in FIG. 3. For each spot the position within the camera coordinate system is determined (as indicated at 902) and this measured position is compared to a reference position of the spot as described with regard to FIG. 9 above.

Figure 10:
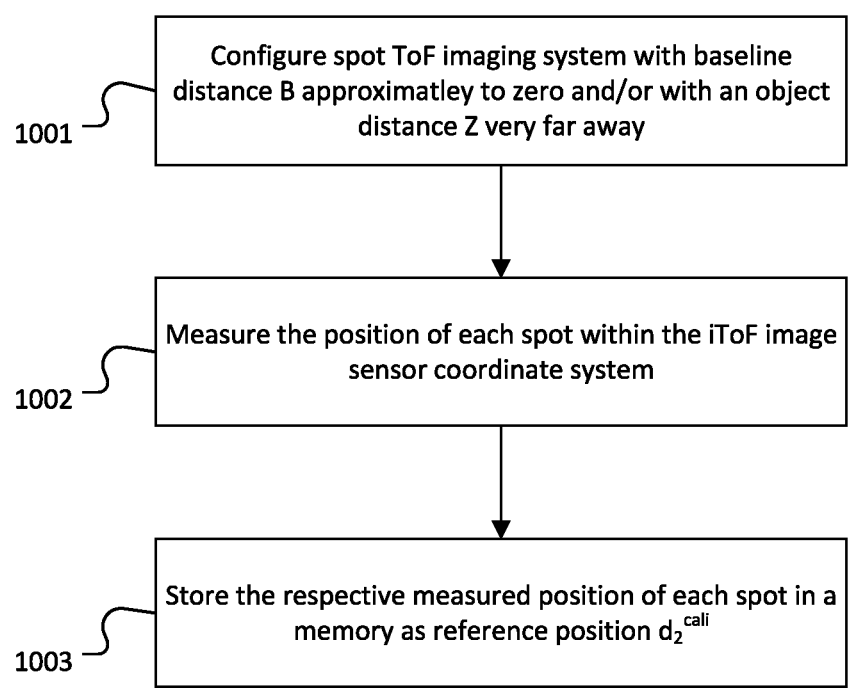
FIG. 10 schematically shows a process of determining expected spot positions by calibration.

FIG. 10 schematically shows a process of determining expected spot positions by calibration. At 1001, a spot ToF imaging system is configured with a baseline distance B of approximately zero and/or an object distance Z very far away. At 1002, the position of each spot within the iToF image sensor coordinate system is measured. At 1003, the measured position of each spot is stored within a memory as an expected position (calibration data).

The object distance Z defined as "very far away" in 1001 may for example be chosen by incrementally increasing the object distance (for example by 1 m) and determining the disparity (spot displacement) after every step. If the spot displacement from one step to the next step is zero (meaning below one pixel) a distance which can be considered as "very far away" has been found. The position of the spot in the image plane at which the spot is not moving any more upon further increase of the distance is considered as the reference position of the spot. For example, an object distance "very far away" may be 15 m (this "far away" distance very much depends on the baseline).

In the embodiment of FIG. 9 two spot displacement classes were defined, namely "inside the unambiguous range" and "outside the unambiguous range". When the spot displacement is zero (i.e., below one pixel) the spot is classified into "outside the unambiguous range" and when displacement was greater than zero (i.e., equal or greater than one pixel) the spot was classified into "inside the unambiguous range". In an alternative embodiment the "boundary" between the two classes may not be a zero pixel spot displacement but another predefined number of pixels, for example 5 pixels or any other predefined number. In that case a spot would be classified into the class "outside the unambiguous range" when the spot displacement is below 5 pixels and classified into "inside the unambiguous range" when the spot displacement is greater or equal to 5 pixels.

In another embodiment the spot ToF system may be configured to disambiguate more than one times the disambiguate range $Z_{disambiguate}$. In this case more than two classes of spot displacements may be defined for example N classes. In this case, for each boundary between two classes a spot displacement threshold $d_k$ may be defined which indicates into which class $k \in [1, N]$ the spot may be classified, wherein each class k corresponds to a wrapping index k. The spot may be classified into class k if the spot's displacement d (i.e., the measured disparity) satisfy the inequality $$d_{k-1} \leq d < d_k$$

wherein the spot displacement threshold $d_N$ may be set to ∞ and the spot displacement threshold $d_0$ to zero. The unambiguous phase delay may then be defined as $$\varphi_{unamb} = \varphi_{amb} + k \cdot 2\pi.$$

In order to disambiguate more than one times the disambiguate range $Z_{disambiguate}$ the baseline distance B or the modulation frequency $f_{mod}$ of the spot ToF system may be configurable and be configured (see FIG. 10) according to the equation given above:

$$B = \frac{pZ\Delta px}{f}$$

Evaluating Disparity Based on Spot Position and Spot Beam Direction

In the embodiment of FIG. 9 disparity information is evaluated by comparing an "actual position" of a spot with an "expected" position (reference position) of the spot. In the embodiment described below in more detail, instead of using an expected position of a spot as a reference position, an "emission position" $d_1$ (see FIG. 6a) in the projection plane of the spot illuminator is used as reference position. This "emission position" $d_1$ reflects the orientation of the spot beam which produces the spot on the scene. The disparity (spot displacement) d in this case may be determined as $d = d_1 - d_2$, where $d_2$ is the position of the spot in the image plane of the camera (actual spot position), and $d_1$ is the position in the projection plane of the spot illuminator which defines the orientation of the spot beam ("emission position").

Figure 11:
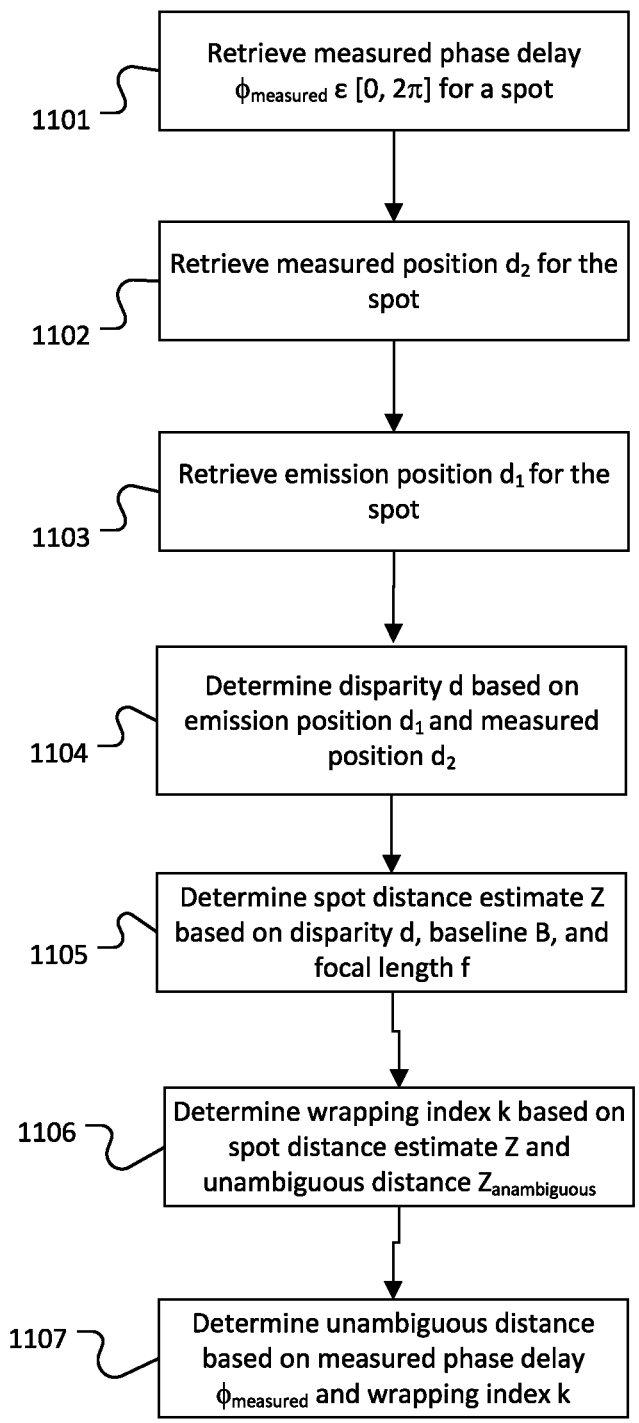
FIG. 11 schematically shows a flow chart of process of an iToF phase disambiguation which evaluates disparity based on spot position and spot beam direction.

FIG. 11 schematically shows a flow chart of process of an iToF phase disambiguation which evaluates disparity based on spot position and spot beam direction. At 1101, a measured phase delay of a spot $\varphi_{measured} \in [0, 2\pi]$ (first phase delay) is retrieved (see 504 in FIG. 5). At 1102, a measured position (actual position) $d_2$ for the spot within the imaging plane of the iToF sensor is retrieved. At 1103, the corresponding predefined emission position $d_1$ that defines the orientation of the spot beam which produces the spot is retrieved from a memory of the iToF system. At 1104, a disparity d is determined based on emission position $d_1$ and measured position $d_2$. At 1105, a spot distance estimate Z is determined based on disparity d, baseline B, and focal length f. At 1106, a wrapping index k is determined based on spot distance estimate Z and predefined unambiguous distance $Z_{anambiguous}$ (see FIG. 2a and corresponding description). At 1107, an unambiguous distance is determined based on measured phase delay $\varphi_{measured}$ and wrapping index k obtained at 1106.

At 1107, the unambiguous distance Z (depth) of the spot may for example be determined based on the unambiguous phase delay $\varphi_{unamb}$, as $Z = (\varphi_{unamb} \cdot Z_{Unambiguous})/2\pi$), wherein $Z_{Unambiguous}$ is the unambiguous range as defined in FIG. 2a.

The determination of the spot distance estimate Z at 1105 may for example be based on the relation between distance Z, disparity d, baseline B, and focal length f described with regard to FIG. 6a above:

$$Z = \frac{f \cdot B}{d}$$

Here, the "focal distance" f of the spot illuminator, which is the distance between baseline B and the (virtual) projection plane of the spot illuminator can be set equal to the focal distance f of the iToF camera, i.e., the distance between the image plane (sensor plane) of the camera and the focal point of the iToF camera.

As stated above, the emission position $d_1$ for each spot may be a predetermined position for each spot which is a position in the projection plane of the spot illuminator which defines an orientation of the spot beam and which is stored in a memory of the iToF system.

Figure 12:
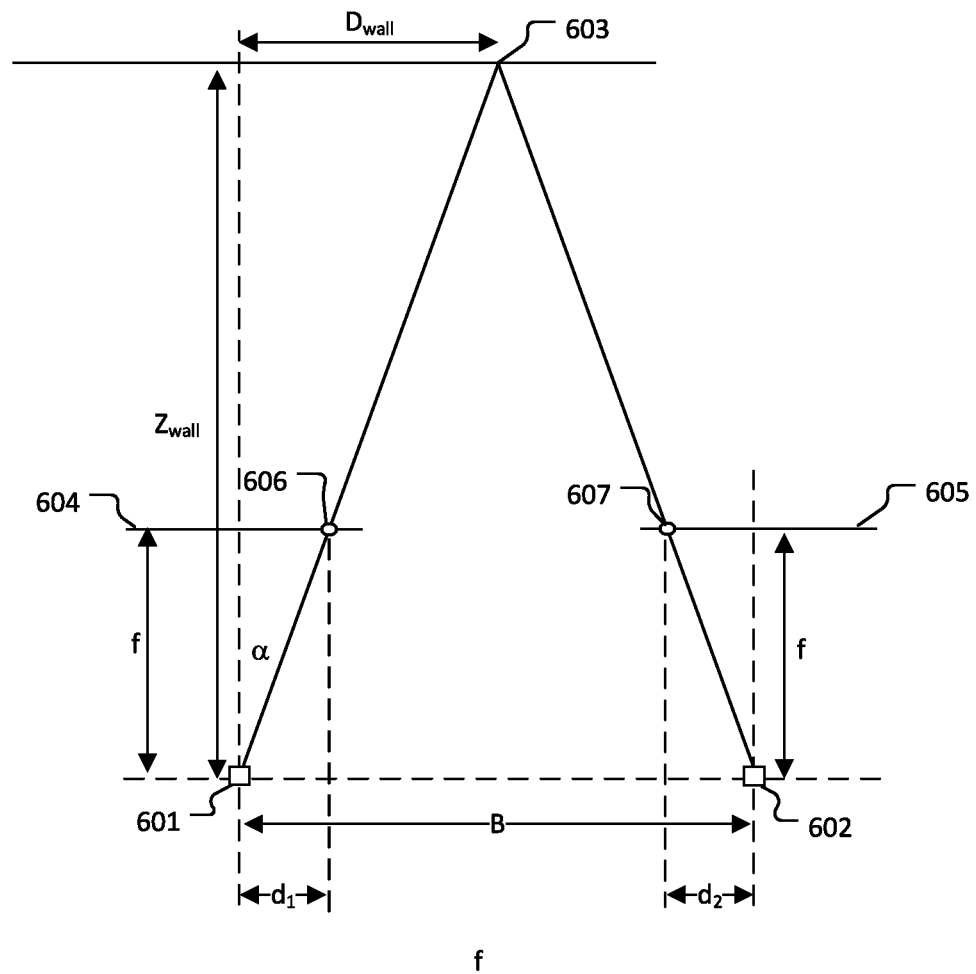
FIG. 12 corresponds to FIG. 6a, and additionally shows as spot beam orientation α, a wall distance $Z_{wall}$ and a spot position $D_{wall}$ on a wall.

In general, this predefined emission position $d_1$ for each spot beam is dependent on the characteristics of the spot illuminator like the position and angle of the controllable nodes of the illuminator 401 (see FIG. 4) or the diffractive optical element (DOE) of the spot illuminator which is disposed in front of the VCSEL array 401 in FIG. 4. It is known in advance from the design of the spot illuminator. Assuming—for illustrative purpose—the simplified pinhole model of FIG. 6a: if α denotes the angle between the spot beam and the direction vertical to the baseline of the ToF system, then the relation between this orientation α of the spot beam can be expressed as $$\tan(\alpha) = \frac{d_1}{f}$$

where f is the distance between the (virtual) projection plane and the focal point/pinhole position of the illumination unit. Alternatively, the orientation α of the spot beam can be obtained by observing the spot pattern generated by the spot illuminator on a plane (e.g. a wall) at distance $Z_{wall}$ and determining the orientation α of the spot beam according to $$\tan(\alpha) = \frac{D_{wall}}{Z_{wall}},$$

where $D_{wall}$ is the position of the spot on the wall relative to the centre of the spot illuminator (vertical dashed line). Beam orientation α, wall distance $Z_{wall}$ and position $D_{wall}$ of the spot are schematically shown in FIG. 12 which otherwise corresponds to FIG. 6a.

Implementation

Figure 13:
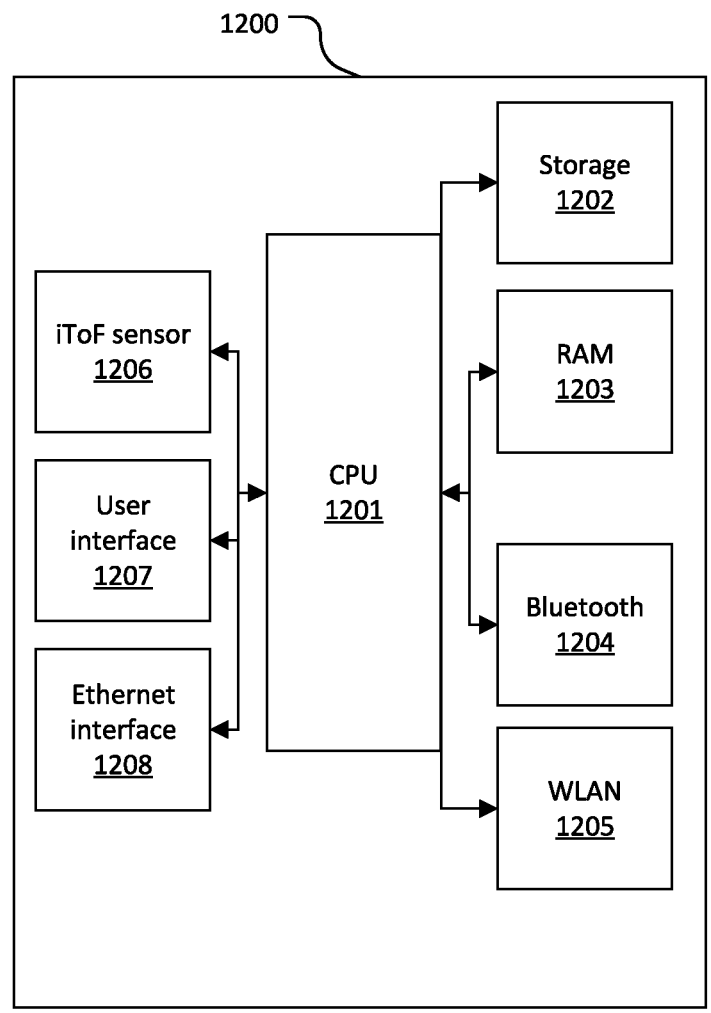
FIG. 13 schematically describes an embodiment of an iToF device that can implement the processes of phase disambiguating with a spot illuminator based on spot disparity.

FIG. 13 schematically describes an embodiment of an iToF device that can implement the processes of phase disambiguating with a spot illuminator based on spot disparity. The electronic device may further implement a process of calibrating measurements of spot coordinate. The electronic device 1200 comprises a CPU 1201 as processor. The electronic device 1200 further comprises an iToF sensor 1206 connected to the processor 1201. The processor 1201 may for example implement disambiguating with a spot illuminator based on spot disparity that realize the process described with regard to FIG. 7 or FIG. 8 in more detail. The electronic device 1200 further comprises a user interface 1207 that is connected to the processor 1201. This user interface 1207 acts as a man-machine interface and enables a dialogue between an administrator and the electronic system. For example, an administrator may make configurations to the system using this user interface 1207. The electronic device 1200 further comprises a Bluetooth interface 1204, a WLAN interface 1205, and an Ethernet interface 1208. These units 1204, 1205 act as I/O interfaces for data communication with external devices. For example, video cameras with Ethernet, WLAN or Bluetooth connection may be coupled to the processor 1201 via these interfaces 1204, 1205, and 1208. The electronic device 1200 further comprises a data storage 1202, which may be the calibration storage described with regards to FIG. 7, and a data memory 1203 (here a RAM). The data storage 1202 is arranged as a long-term storage, e.g., for storing the algorithm parameters for one or more use-cases, for recording iToF sensor data obtained from the iToF sensor 1206 the like. The data memory 1203 is arranged to temporarily store or cache data or computer instructions for processing by the processor 1201.

It should be noted that the description above is only an example configuration. Alternative configurations may be implemented with additional or other sensors, storage devices, interfaces, or the like.

It should be recognized that the embodiments describe methods with an exemplary ordering of method steps. The specific ordering of method steps is, however, given for illustrative purposes only and should not be construed as binding. For example, steps 801, 802 or 803 in FIG. 8 could be exchanged.

It should also be noted that the division of the electronic device of FIG. 13 into units is only made for illustration purposes and that the present disclosure is not limited to any specific division of functions in specific units. For instance, at least parts of the circuitry could be implemented by a respectively programmed processor, field programmable gate array (FPGA), dedicated circuits, and the like.

All units and entities described in this specification and claimed in the appended claims can, if not stated otherwise, be implemented as integrated circuit logic, for example, on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below:

(1) An electronic device (101) comprising circuitry configured to disambiguate a first phase delay ($\varphi_{measured}$) obtained according to an indirect Time-of-Flight principle to obtain a second phase delay ($\varphi_{unamb}$), wherein the circuitry is configured to disambiguate the first phase delay ($\varphi_{measured}$) based on a captured spot position ($d_2$).

(2) The electronic device of (1), wherein the captured spot position ($d_2$) relates to a spot produced by a spot illuminator (110).

(3) The electronic device (101) of (1) or (2), wherein the circuitry is configured to determine a spot disparity (d, Δpx, $d_2^{cal}-d_2$, $d_1-d_2$) based on the spot position ($d_2$), and to disambiguate the first phase delay ($\varphi_{measured}$) based on the spot disparity (d, Δpx).

(4) The electronic device (101) of anyone of (1) to (3), wherein the circuitry is configured to determine the spot disparity (d, Δpx, $d_2^{cal}-d_2$, $d_1-d_2$) based on the spot position ($d_2$) and based on a reference position ($d_1$, $d_2^{cal}$) of the spot.

(5) The electronic device (101) of (4), wherein the reference position is a predefined expected position ($d_2^{cal}$)

(6) The electronic device (101) of (5), wherein the circuitry is configured to retrieve the predefined expected position ($d_2^{cal}$) from a memory.

(7) The electronic device (101) of anyone of (4) to (6), wherein the circuitry is configured to determine that the first phase delay ($\varphi_{measured}$) is outside an unambiguous range ($Z_{Unambiguous}$) if the position ($d_2$) of the captured spot is equal to the reference position ($d_1$, $d_2^{cal}$) of the spot.

(8) The electronic device (101) of (7) wherein the circuitry is configured to determine (805) the unambiguous phase delay ($\varphi_{unamb}$) for the spot as identical to the first phase delay ($\varphi_{measured}$) if the first phase delay ($\varphi_{measured}$) is inside an unambiguous range ($Z_{Unambiguous}$).

(9) The electronic device (101) of anyone of (1) to (8) wherein the circuitry is configured to determine (804) that the first phase delay ($\varphi_{measured}$) is inside an unambiguous range ($Z_{Unambiguous}$) if the position ($d_2$) of the captured spot is equal to the reference position ($d_1$, $d_2^{cal}$) of the spot.

(10) The electronic device (101) of (9) wherein the circuitry is configured to determine (806) the unambiguous phase delay ($\varphi_{unamb}$) for the spot as 2π+the first phase delay ($\varphi_{measured}$), if the first phase delay ($\varphi_{measured}$) is outside an unambiguous range ($Z_{Unambiguous}$).

(11) The electronic device (101) of anyone of (1) to (10), wherein the circuitry is configured to determine an unambiguous distance of the spot based on the second phase delay ($\varphi_{unamb}$).

(12) The electronic device (101) of anyone of (1) to (11) further comprising an iToF image sensor (102a), wherein the circuitry is configured to determine (801) the first phase delay ($\varphi_{measured}$) from a phase image obtained with the iToF image sensor (102a).

(13) The electronic device (101) of anyone of (1) to (12) further comprising the spot illuminator (110) wherein the spot illuminator (110) produces a pattern of light spots, and wherein the circuitry is configured to disambiguate a phase measurement for each spot produced by the spot illuminator (110).

(14) The electronic device (101) of (13) wherein the image analysis performed on the iToF/confidence/amplitude image (705) comprises a local maximum search.

(15) A system comprising a spot illuminator (110), an image sensor (102*a*) and the electronic device of (1), wherein the spot illuminator (110) and the image sensor (102*a*) are spaced apart by a baseline distance (B), and wherein the spot disparity (d, Δpx) depends on the baseline distance (B).

(16) The system of (15), wherein the circuitry is configured to determine an object distance estimate (Z) based on the spot disparity (d, Δpx), based on the baseline distance (B) and based on a modulation frequency ($f_{mod}$), and to disambiguate the first phase delay ($\varphi_{measured}$) based on the object distance (Z).

(17) The system of (15) or (16), wherein an unambiguous range ($Z_{Unambiguous}$) is based on a modulation frequency ($f_{mod}$).

(18) A method comprising disambiguating a first phase delay ($\varphi_{measured}$) obtained according to an indirect Time-of-Flight principle to obtain a second phase ($\varphi_{unamb}$), wherein the disambiguating of the first phase delay is based on a captured spot position ($d_2$).

(19) The method of (18), comprising performing a calibration measurement to obtain a reference position ($d_2^{cal}$), and wherein determining the spot disparity (d, Δpx) is based on the spot position ($d_2$) and the reference position ($d_2^{cal}$).

(20) The method of (18) or (19), wherein the reference position of the spot is measured with a baseline distance (B) of approximately zero and/or with the object (203; 204) being far away.

The invention claimed is:

1. An electronic device comprising circuitry configured to disambiguate a first phase delay obtained according to an indirect Time-of-Flight principle to obtain a second phase delay, wherein the circuitry is configured to disambiguate the first phase delay based on a captured spot position.

2. The electronic device of claim 1, wherein the captured spot position relates to a spot produced by a spot illuminator.

3. The electronic device of claim 1, wherein the circuitry is configured to determine a spot disparity based on the spot position, and to disambiguate the first phase delay based on the spot disparity.

4. The electronic device of claim 1, wherein the circuitry is configured to determine the spot disparity based on the spot position and based on a reference position of the spot.

5. The electronic device of claim 4, wherein the reference position is a predefined expected position.

6. The electronic device of claim 5, wherein the circuitry is configured to retrieve the predefined expected position from a memory.

7. The electronic device of claim 4, wherein the circuitry is configured to determine that the first phase delay is outside an unambiguous range if the position of the captured spot is equal to the reference position of the spot.

8. The electronic device of claim 7, wherein the circuitry is configured to determine the unambiguous phase delay for the spot as identical to the first phase delay if the first phase delay is inside an unambiguous range.

9. The electronic device of claim 1, wherein the circuitry is configured to determine that the first phase delay is inside an unambiguous range if the position of the captured spot is equal to the reference position of the spot.

10. The electronic device of claim 9, wherein the circuitry is configured to determine the unambiguous phase delay for the spot as 2π+the first phase delay, if the first phase delay is outside an unambiguous range.

11. The electronic device of claim 1, wherein the circuitry is configured to determine an unambiguous distance of the spot based on the second phase delay.

12. The electronic device of claim 1, further comprising an iToF image sensor, wherein the circuitry is configured to determine the first phase delay from a phase image obtained with the iToF image sensor.

13. The electronic device of claim 1, further comprising the spot illuminator wherein the spot illuminator produces a pattern of light spots, and wherein the circuitry is configured to disambiguate a phase measurement for each spot produced by the spot illuminator.

14. The electronic device of claim 13, wherein the image analysis performed on the iToF/confidence/amplitude image comprises a local maximum search.

15. A system comprising a spot illuminator, an image sensor and the electronic device of claim 1, wherein the spot illuminator and the image sensor are spaced apart by a baseline distance, and wherein the spot disparity depends on the baseline distance.

16. The system of claim 15, wherein the circuitry is configured to determine an object distance estimate based on the spot disparity, based on the baseline distance and based on a modulation frequency, and to disambiguate the first phase delay based on the object distance.

17. The system of claim 15, wherein an unambiguous range is based on a modulation frequency.

18. A method comprising disambiguating a first phase delay obtained according to an indirect Time-of-Flight principle to obtain a second phase, wherein the disambiguating of the first phase delay is based on a captured spot position.

19. The method of claim 18, comprising performing a calibration measurement to obtain a reference position, and wherein determining the spot disparity is based on the spot position and the reference position.

20. The method of claim 18, wherein the reference position of the spot is measured with a baseline distance of approximately zero and/or with the object being far away.

* * * * *